US012584061B2

(12) United States Patent
Vaidya et al.

(10) Patent No.:  US 12,584,061 B2
(45) Date of Patent:  Mar. 24, 2026

(54) METHOD FOR CONSOLIDATING SUBTERRANEAN FORMATION

(71) Applicant: Schlumberger Technology Corporation, Sugar Land, TX (US)

(72) Inventors: Nirupama Vaidya, Sugar Land, TX (US); Rasika Prabhu, Sugar Land, TX (US); Patrice Abivin, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/714,349

(22) PCT Filed: Dec. 7, 2022

(86) PCT No.: PCT/US2022/081057
§ 371 (c)(1),
(2) Date: May 29, 2024

(87) PCT Pub. No.: WO2023/107978
PCT Pub. Date: Jun. 15, 2023

(65) Prior Publication Data
US 2025/0320403 A1  Oct. 16, 2025

Related U.S. Application Data

(60) Provisional application No. 63/265,154, filed on Dec. 8, 2021.

(51) Int. Cl.
*C09K 8/575* (2006.01)
*E21B 33/138* (2006.01)
*E21B 43/267* (2006.01)

(52) U.S. Cl.
CPC .......... *C09K 8/5751* (2013.01); *E21B 33/138* (2013.01); *E21B 43/267* (2013.01)

(58) Field of Classification Search
None
See application file for complete search history.

(56) References Cited

U.S. PATENT DOCUMENTS

| | | | |
|---|---|---|---|
| 4,000,781 A | 1/1977 | Knapp | |
| 6,613,720 B1 * | 9/2003 | Feraud | E21B 43/26 166/305.1 |
| 10,604,694 B1 | 3/2020 | Berger | |
| 10,723,940 B2 | 7/2020 | Khamatnurova | |
| 11,781,058 B1 * | 10/2023 | Berger | C09K 8/5756 166/295 |
| 2010/0101773 A1 | 4/2010 | Nguyen | |

(Continued)

OTHER PUBLICATIONS

Search Report and Written Opinion of International Patent Application No. PCT/US2022/081057 dated Apr. 7, 2023, 9 pages.

*Primary Examiner* — Andrew Sue-Ako
(74) *Attorney, Agent, or Firm* — Kyle R. Miiller

(57) ABSTRACT

A system for consolidating particles in a subterranean formation includes a treatment fluid (e.g., a consolidation fluid) having a viscosity lower than 5 cP. The treatment fluid includes a resin system, a surfactant, and a curing agent. A method for consolidating particles in a subterranean formation includes preparing the treatment fluid, introducing the treatment fluid into the subterranean formation, and allowing the treatment fluid to cure to consolidate the particles in the subterranean formation.

20 Claims, 8 Drawing Sheets

Mineral Oil

UCS = 1458 lbf/in$^2$

Diesel Oil

UCS = 2160 lbf/in$^2$

Crude Oil

UCS = 2480 lbf/in$^2$

Test Temperature - 140°F; Curing Time - 3 days

(56) References Cited

U.S. PATENT DOCUMENTS

| | | | |
|---|---|---|---|
| 2010/0186954 A1 | 7/2010 | Nguyen | |
| 2010/0326660 A1 | 12/2010 | Ballard | |
| 2011/0257051 A1* | 10/2011 | Welton | ................... C09K 8/506 |
| | | | 507/233 |
| 2016/0333249 A1 | 11/2016 | Patil | |
| 2020/0063025 A1 | 2/2020 | Lieng | |

* cited by examiner

Fluid Stability After 24 Hours at 77°F

Fluid Stability After 90 min at 140°F

Fluid Stability After 2 Hours at 122°F

230°F

140°F

104°F

Test Temperature - 140°F; Curing Time - 3 days

1

METHOD FOR CONSOLIDATING SUBTERRANEAN FORMATION

CROSS-REFERENCE TO RELATED APPLICATION

This patent application is a National Stage Entry of International Application No. PCT/US2022/081057, filed Dec. 7, 2022, which claims benefit of U.S. Provisional Patent Application No. 63/265,154, filed Dec. 8, 2021, which is entirely incorporated herein by reference.

FIELD

This patent application describes systems and methods for consolidating subterranean formation. Specifically, this patent application describes systems and methods for preparing a sustainable, single-step sand consolidation fluid.

BACKGROUND

Sand production from unconsolidated sandstone reservoirs can adversely affect reservoir productivity and project profitability. Sand consolidation is a remedial technology that consists of injecting a fluid into the formation to bind the sand grains together and provide strong cohesion. Most existing consolidation technologies use solvent-based fluids, which increases the operational complexity of achieving successful treatment without compromising retained permeability and raises environmental concerns.

Sand production from unconsolidated reservoirs can adversely impact production rates and extensively damage surface facilities and downhole equipment. It can also raise production costs as the presence of sand in produced fluids requires separation and disposal of the sand on surface. Hence, to mitigate these issues, operators often opt for sand control treatments. Common sand control methodologies include mechanical methods such as standalone screens, gravel-packs, frac-pack treatments, and chemical techniques such as in situ sand.

Chemical sand consolidation controls the undesirable production of sand by chemically binding the loose sand grains with a furan or epoxy-based resin. When the resin is injected into the unconsolidated formation, it coats the surfaces of the sand grains. After sufficient time at bottom-hole temperature, the resin hardens thereby consolidating the formation.

Traditional resin consolidation systems are often solvent-based and hence raise environmental considerations. They are also externally catalyzed, which means that the injection of the resin is followed by an overflush of the chemical activator. The overflush often does not distribute uniformly in the formation, resulting in insufficient resin polymerization and suboptimal consolidation. The need for post-treatment flushes also adds operational complexity. There is a need for an improved sand consolidation system and method.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admission of prior art.

2

SUMMARY

Embodiments described herein provide a method for consolidating particles in a subterranean formation comprising preparing a treatment fluid (e.g., consolidation fluid) having a viscosity lower than about 5 cP. The treatment fluid includes a resin system, a surfactant, and a curing agent. In some embodiments, the treatment fluid has a viscosity less than about 5 cP for up to twenty-four hours at ambient temperature. In some embodiments, the surfactant has a cloud point or lower critical solution temperature (LCST) ranging from 100° F. to about 300° F. In some embodiments, the resin system has a viscosity lower than 50 cP. The method also includes introducing the treatment fluid into the subterranean formation and allowing the fluid to cure to consolidate particles in the subterranean formation. In some embodiments, a temperature of the subterranean formation is at least the LCST of the surfactant.

Embodiments described herein provide a system for consolidating particles in a subterranean formation. The system includes a treatment fluid (e.g., consolidation fluid) having a viscosity lower than 5 cP. The treatment fluid includes a resin system, a surfactant, and a curing agent. In some embodiments, the treatment fluid has a viscosity less than about 5 cP for up to twenty-four hours at ambient temperature. In some embodiments, the surfactant has a cloud point or lower critical solution temperature (LCST) ranging from 100° F. to about 300° F. In some embodiments, the resin system has a viscosity lower than 50 cP. The method also includes introducing the treatment fluid into the subterranean formation and allowing the fluid to cure to consolidate particles in the subterranean formation. In some embodiments, a temperature of the subterranean formation is at least the LCST of the surfactant.

Various refinements of the features noted above may be undertaken in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments. Additionally, it is contemplated that elements and features of one embodiment may be beneficially incorporated in other embodiments without further recitation.

DETAILED DESCRIPTION

Figure 1:
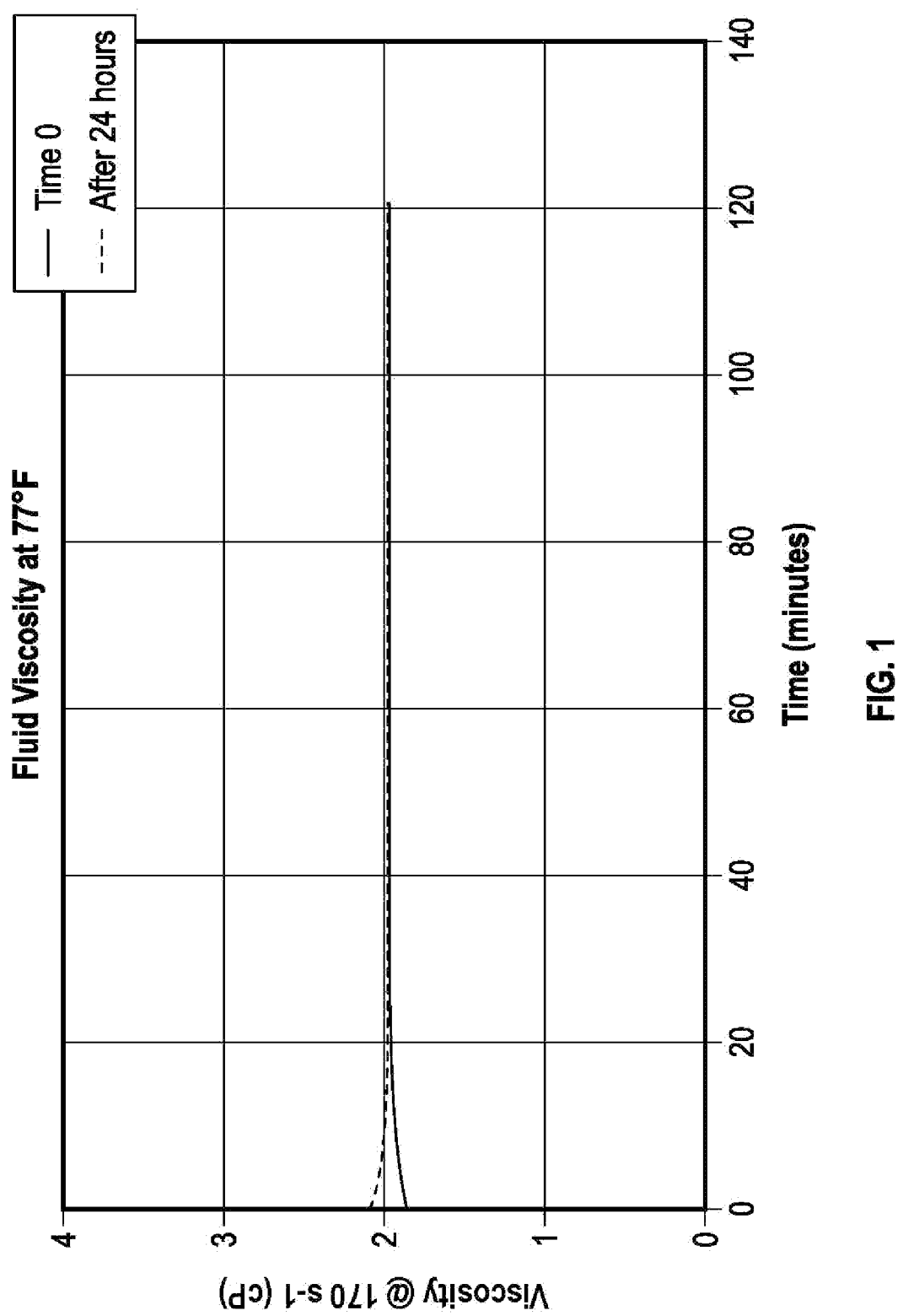
FIG. 1 illustrates a graph of steady shear viscosity of a consolidation fluid over time, according to embodiments of the disclosure.

One or more specific embodiments of the present disclosure will be described below. In an effort to provide a concise description of these embodiments, all features of an actual implementation may not be described in the specification. It should be appreciated that in the development of the any such actual implementation, as in any engineering or design project, numerous implementation-specific decisions must be made to achieve the developers' specific goals, such as compliance with system-related and business-related constrains, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Embodiments of the present disclosure are directed to a sustainable, single-step consolidation fluid and methods of preparing thereof. The consolidation fluid is composed of a resin (e.g., a resin system), a curing agent, and a surfactant dispersed in an aqueous solvent (e.g., water). In some embodiments, the surfactant has a cloud point or lower critical solution temperature (LCST) ranging from about 100° F. to about 300° F. The fluid is internally catalyzed and activated by temperature. This allows the components of the fluid (e.g., the resin, the curing agent, and the surfactant) to be mixed at the surface (e.g., via a batch mixer), resulting in a single-stage treatment that significantly simplifies field operations.

Additionally, the lack of hazardous solvents in the consolidation fluid results in a more sustainable process of preparing the consolidation fluid as compared to conventional consolidation fluids. Further, embodiments of the consolidation fluid introduce more sustainability into the oilfield. The consolidation fluid performs well over wide reservoir permeabilities and temperature ranges and is also compatible with clays and oils.

As mentioned above, the consolidation fluid described herein includes a resin, a curing agent, and a surfactant dispersed in an aqueous solvent (e.g., water). In certain embodiments, the fluid is prepared by sequentially adding required quantities of the surfactant, resin, and curing agent to fresh water. The fluid is mixed at medium speed using an overhead mixer for seventy-five (75) minutes. After the fluid is mixed, the fluid was stable for approximately twenty-four (24) hours at ambient temperature (e.g., 77° F.).

The consolidation fluid was characterized in the laboratory in terms of viscosity, stability at elevated temperature, and consolidation performance. The compatibility of the consolidation fluid with various clays and oils and the stability of the consolidation fluid in the presence of acid was also studied. Additionally, regained permeability and compressive strength of the consolidated sand were quantified for clean sand and sand with different amounts of clays. The fluid performed well over a wide temperature range (104° F. to 230° F.) and is compatible with clays (up to 30%) and oils (e.g., mineral, diesel, and crude oils). Once mixed, the fluid had a very low viscosity (<5 cP at 170 s$^{-1}$), which enables use of the fluid in low-permeability formations. The low viscosity of the fluid also provides simplified operational control and reduces pumping risks in a wide range of reservoir applications.

Embodiments of the consolidation fluid were designed to have a steady shear viscosity of less than 5 cP for at least 24 hours at ambient temperature and for one to two hours at slightly elevated temperatures. This was important for operational simplicity in terms of mixing and placement and for preventing premature setting of the resin in the mixing equipment (post preparation) and tubulars during pumping.

Embodiments of the consolidation fluid use limited resin with the balance being predominantly water. The large volume fraction of water acts as a spacer, resulting in high retained permeability (greater than 75%) of the fluid after the resin has set. Once the fluid is mixed, the fluid has a very low viscosity (less than 5 cP at ambient temperature and 170 s$^{-1}$) and is stable for at least 24 hours. Additionally, the consolidation mechanism is uniquely triggered by temperature, providing more control, and reducing operational risks. This mechanism allows all required components to be mixed together and the treatment to be single stage, thus drastically improving operational efficiency. The consolidation fluid functions well over a wide temperature range (104° F. to 230° F.) yielding an unconfined compressive strength (UCS) of up to 2800 lbf/in$^2$ while maintaining regained permeability of over 75%. It is also compatible with a significant amounts of clays, thereby enabling its use in challenging reservoir conditions.

EXAMPLES

Figure 2:
FIG. 2 is an image of a stability study (e.g., bottle test) of the consolidation fluid of FIG. 1, according to embodiments of the disclosure.

Example 1: Viscosity of the Treatment Fluid (e.g., Consolidation Fluid) at 77° F. Immediately after Preparation and 24 Hours Later FIG. 1 shows the steady shear viscosity of the consolidation fluid at ambient temperature (77° F.) and 170 s$^{-1}$ immediately after preparation and 24 hours later. The fluid viscosity remains constant and stays well below 5 cP over 24 hours. The low viscosity of the fluid facilitates its use in formations having low permeabilities. FIG. 2 is an image of a stability study (e.g., a bottle test) of the consolidation fluid. The stability study of the consolidation fluid showed no phase separation or settling over a 24-hour period at ambient temperature (i.e., 77° F.).

Figure 3:
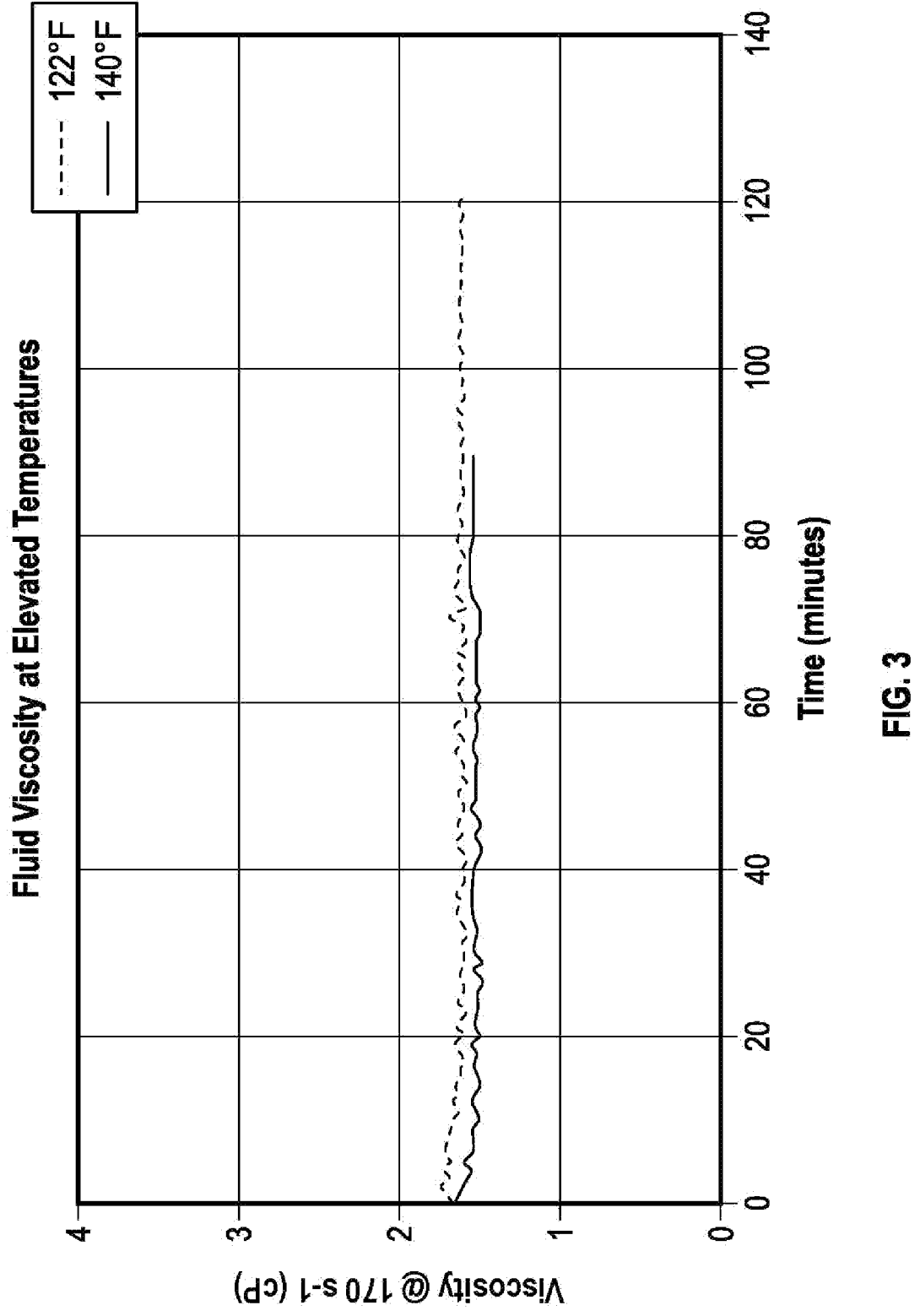
FIG. 3 illustrates a graph of steady shear viscosity of a consolidation fluid over time, according to embodiments of the disclosure.
Figure 4:
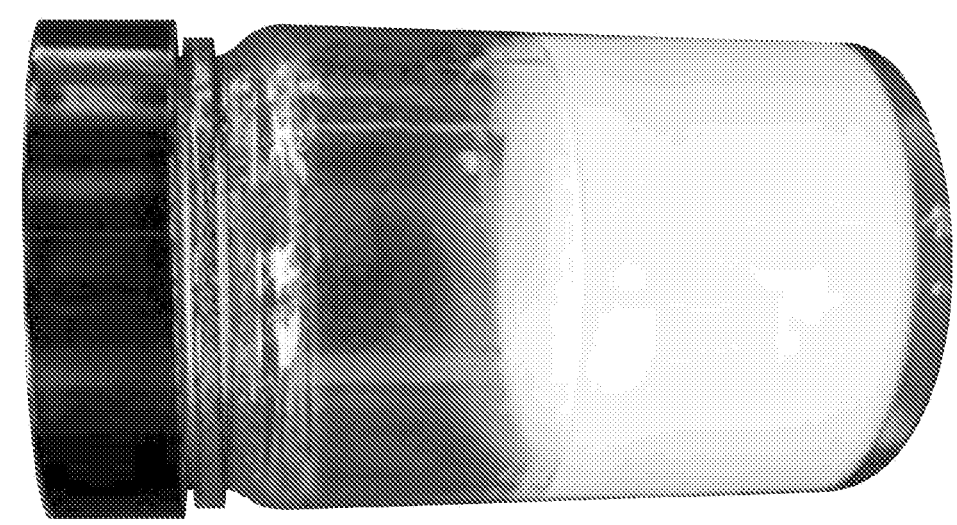
FIG. 4 is an image of a stability study (e.g., bottle test) of the consolidation fluid of FIG. 3, according to embodiments of the disclosure.
Figure 4:
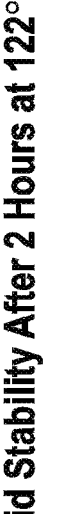
Figure 4:
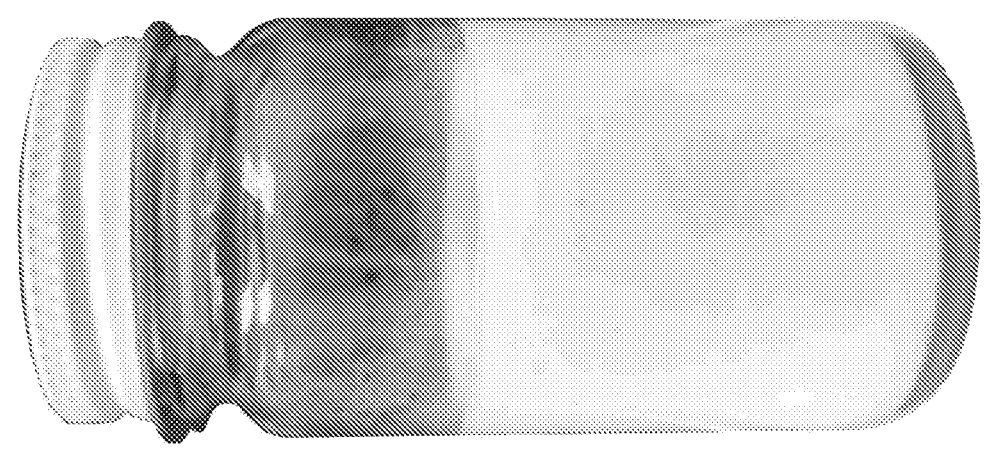

Example 2: Viscosity of the Treatment Fluid at Slightly Elevated Temperatures FIG. 3 shows the steady shear viscosity of the consolidation fluid at slightly elevated temperatures (i.e., 122° F. and 140° F.) and 170 s$^{-1}$ immediately after preparation. At slightly elevated temperatures (up to about 140° F.), the 170 s$^{-1}$ steady shear fluid viscosity remained much lower than 5 cP for at least 1 to 2 hours. No increase in viscosity indicative of resin setting was observed. This quality of the fluid is beneficial as it allows for sufficient pumping time and accurate placement of the consolidation fluid downhole even at slightly elevated temperatures (less than or equal to 140° F.) without the risk of premature resin setting. FIG. 4 is an image of a stability study (e.g., a bottle test) of the consolidation fluid. The fluid stability tests showed no phase separation or settling.

Example 3: Performance (Unconfined Compressive Strength (UCS) and Retained Permeability) of the Resin Consolidation Fluid at Different Temperatures. Consolidated Sand Packs were Prepared Using 100-Mesh Sand Two performance indicators for sand consolidation fluid are compressive strength and retained permeability after consolidation. Treating a formation with a sand consolidation fluid may result in a reduction in reservoir permeability. Higher compressive strengths of the sand consolidation fluid may lead to reduced permeabilities of the formation. Hence, it is technically challenging to provide a sand consolidation fluid that provides a balance between high compressive strength and retained permeability. A UCS over 500 lbf/in$^2$ (sometimes over 1,000 lbf/in$^2$) of a sand consolidation fluid is generally desirable for sand consolidation. Improvements in rock compressive strength via resin consolidation treatments enhances production by increasing the maximum drawdown that can be applied to the formation.

To evaluate performance of the consolidation fluid, consolidated sand packs were prepared at several different temperatures using 100-mesh sand. The curing time (e.g., shut-in time) varied as a function of temperature, and was 3 days at temperatures less than 180° F. and 1 day at temperatures greater than 180° F. Table 1 shows the retained permeability and UCS of the consolidated sand packs (e.g., prepared using 100-mesh sand). At each temperature tested, the consolidation fluid delivered compressive strengths greater than 1,000 lbf/in$^2$ while maintaining retained permeabilities of over 75%. Also, it is important to note that unlike traditional resin treatments, an over flush was not required to improve the retained permeability after the treatment. Instead, the large volume fraction of water in the consolidation fluid acts as a spacer, resulting in high retained permeability after the resin has set.

TABLE 1

| Sand Type | Pore Volumes of Treatment Fluid Injected | Curing Temperature (° F.) | Curing Time (days) | Consolidated Sand Pack UCS (lbf/in$^2$) | Consolidated Sand Pack Retained Permeability (%) |
|---|---|---|---|---|---|
| 100 mesh | 3 | 104 | 3 | 1756 | 84 |
| | | 140 | 3 | 1091 | 82 |
| | | 175 | 3 | 1310 | 78 |
| | | 194 | 1 | 2230 | 76 |
| | | 230 | 1 | 2850 | 87 |

Figure 5:
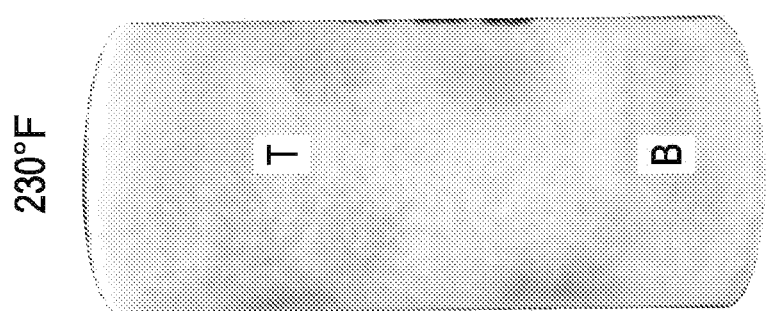
FIG. 5 is an image showing representative consolidated sand packs prepared at different curing temperatures, according to embodiments of the disclosure.
Figure 5:
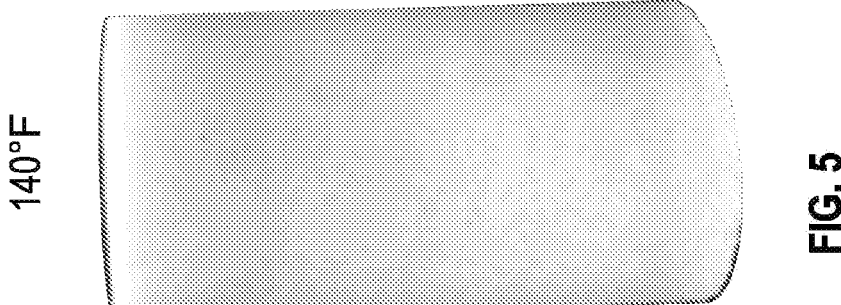
Figure 5:
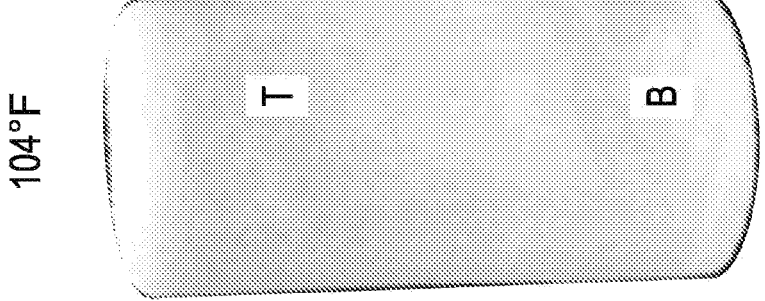

Example 4: Representative Consolidated Sand Packs Prepared at Different Curing Temperatures Using 100-Mesh Sand FIG. 5 is an image showing representative consolidated sand packs prepared at different curing temperatures using 100-mesh sand. The consolidated sand packs were visually inspected, and no sanding or cracks were observed.

Figure 6:
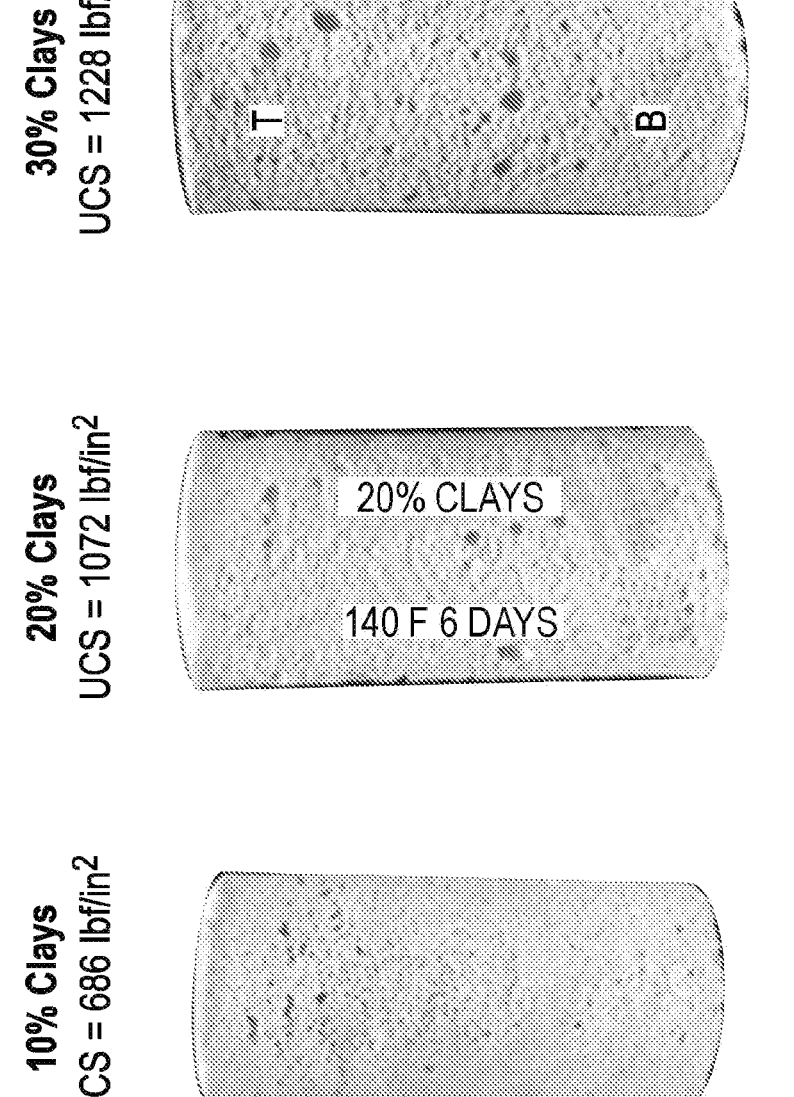
FIG. 6 is a series of images showing consolidated sand packs with sand containing clays and respective unconfined compressive strength (UCS), according to embodiments of the disclosure.

Laboratory testing was performed to evaluate if the treatment fluid (e.g., consolidation fluid) could consolidate sand containing about 10% to about 30% clays. This is important since reservoirs requiring sand consolidation treatment are rarely devoid of clays. All reservoirs can be expected to contain anywhere from about 5% to about 40% clays as a mixture of swelling and migrating clays. FIG. 6 is a series of images showing the consolidated sand packs with sand containing clays and their respective UCS. The fluid was able to consolidate sand containing clays in the range tested with high compressive strength. The sand packs were cured at 140° F. for 6 days.

Figure 7:
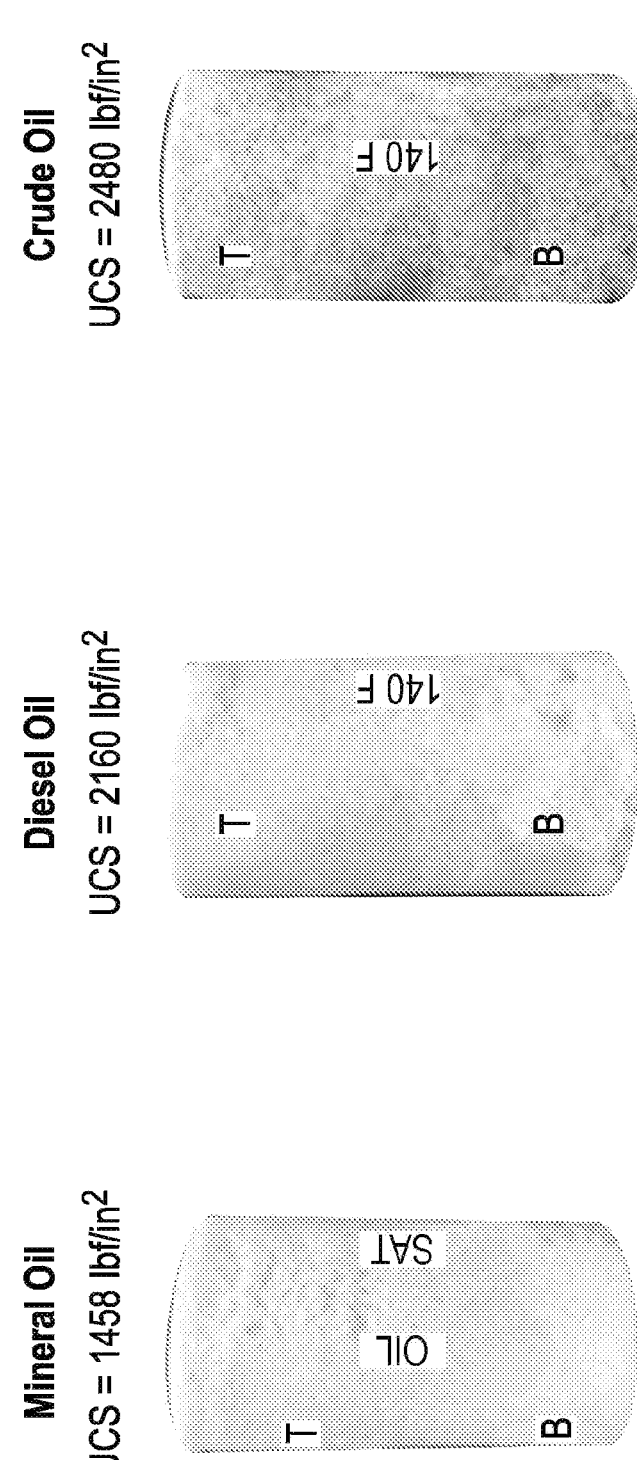
FIG. 7 is a series of images showing consolidated sand packs prepared with oil-saturated sand packs and respective UCS, according to embodiments of the disclosure.

In addition to clay compatibility, the compatibility of the consolidation fluid with oil was tested. The objective of this test was to determine if the consolidation fluid could successfully displace the oil from an oil-saturated sand pack and consolidate it. The need for a mutual solvent flush prior to treatment injection was also determined with these tests. Three oil types were tested: mineral oil, diesel oil, and crude oil. The consolidation fluid was compatible with diesel and mineral oils and was able to consolidate the oil saturated sand. In the presence of crude oil, due to the viscosity ratio, a pre-flush with mutual solvent was required to aid the treatment fluid to uniformly displace the oil and saturate the unconsolidated sand. FIG. 7 is a series of images showing the consolidated sand packs prepared with oil-saturated sand packs and their corresponding compressive strengths. All tests were performed with 100-mesh sand. The treated sand packs were cured in an oven at 140° F. for 3 days.

Figure 8:
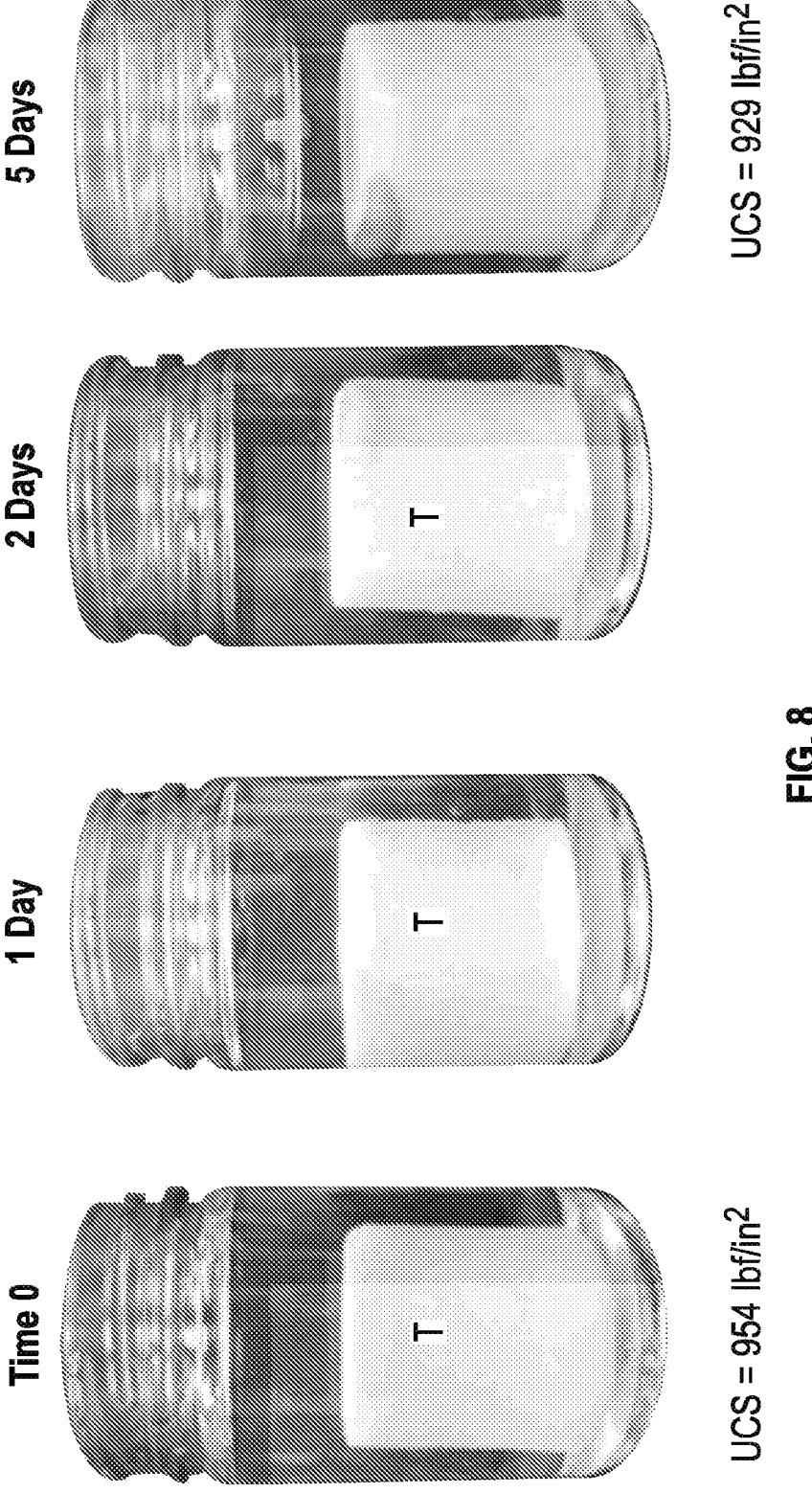
FIG. 8 is a series of images showing photographs of an acid-soaked consolidated sand pack over a five-day period, according to embodiments of the disclosure.

A sand consolidation treatment can sometimes be followed by an acid stimulation job. Therefore, determining the stability of the consolidated sand pack in presence of acid is important. To test this, a consolidated sand pack was soaked in 15% HCl at 140° F. for 5 days. At the end of 5 days, the consolidated sand pack was visually examined for its integrity, and its compressive strength was measured. The UCS of the acid-soaked consolidated sand pack was 929 lbf/in$^2$, which was 97% of the UCS of the original consolidated sand pack (954 lbf/in$^2$). This showed that 15% HCl had insignificant impact on the efficacy of the consolidation treatment. FIG. 8 is a series of images showing photographs of the acid-soaked consolidated sand pack over the 5-day soaking period, demonstrating its stability.

The new resin-based sand consolidation fluid was characterized in the laboratory in terms of viscosity, stability at elevated temperature, and consolidation performance. The consolidation mechanism is designed to be triggered downhole by temperature. This allowed the treatment to be single stage, thus significantly improving operational simplicity.

Once mixed, the fluid has a very low viscosity (less than 5 cP at 170 s$^{-1}$) and is stable for at least 24 hours. This is important for operational simplicity. Additionally, the low viscosity of the fluid facilitates its use in low-permeability formations. The applicable temperature range for the product is from about 104° F. to about 230° F. At these temperatures, the treatment can generate consolidated sand packs with compressive strengths greater than 1,000 lbf/in$^2$ and retained permeabilities in excess of 75%. Unlike traditional resin systems, this new resin sand consolidation system does not require an over-flush treatment to improve the reservoir retained permeability. The large volume fraction of water in the resin consolidation fluid acts as a spacer, resulting in high retained permeability after the resin has set.

The consolidation fluid is compatible with formation clays. It can consolidate sand containing up to about 30% clays, with the resulting sand packs having high compressive strengths. The consolidation fluid is also compatible with mineral, diesel, and crude oils and can be used to treat oil wet formations. In presence of crude oils, a pre-flush with mutual solvent is required to aid the treatment fluid to displace the oil.

The consolidation produced by this consolidation fluid is resistant to acid. Soaking the consolidated sand packs in 15% HCl at 140° F. for 5 days had no impact on the efficacy of the consolidation treatment. Compared to traditional resin systems, the consolidation system (e.g., the consolidation fluid) disclosed herein is free of hazardous solvents, thus making the sand consolidation process more sustainable.

While the foregoing is directed to embodiments of the subject matter of this disclosure, other and further embodiments of the present disclosure may be devised without departing from the basic scope thereof, and the scope thereof is determined by the claims that follow. The specific embodiments described above have been illustrated by way of example and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. A system for consolidating particles in a subterranean formation, the system comprising:
   a treatment fluid having a viscosity less than 5 cP, wherein the treatment fluid, after curing via a curing agent at a temperature above 100° F., has a compressive strength greater than 1,000 lbf/in$^2$ and up to 2,850 lbf/in$^2$ and a retained permeability of over 75%, the treatment fluid comprising:
      a resin system;
      a surfactant having a cloud point or lower critical solution temperature (LCST) ranging from about 100° F. to about 300° F.; and
      the curing agent.

2. The system of claim 1, wherein the treatment fluid has the viscosity less than about 5 cP for up to twenty-four hours at ambient temperature.

3. The system of claim 1, wherein a temperature of the subterranean formation is at least the LCST of the surfactant.

4. The system of claim 1, wherein the resin system has a resin viscosity less than about 50 cP.

5. The system of claim 1, wherein preparing the treatment fluid comprises mixing the resin system, the surfactant, and the curing agent in an aqueous solvent.

6. The system of claim 5, wherein the aqueous solvent comprises fresh water.

7. The system of claim 5, wherein the aqueous solvent comprises up to 5% KCl.

8. The system of claim 1, wherein the particles in the subterranean formation comprise sand in the subterranean formation, proppant pumped into one or more fractures of the subterranean formation, or both.

9. The system of claim 1, wherein the viscosity of the treatment fluid stays below 5 cP for up to two hours at an additional temperature up to about 140° F.

10. The system of claim 1, wherein the viscosity of the treatment fluid is less than 5 cP for at least 24 hours at ambient temperature.

11. A method for consolidating particles in a subterranean formation comprising:
   preparing a treatment fluid having a viscosity less than about 5 cP, the treatment fluid comprising:
      a resin system;
      a surfactant having a cloud point or lower critical solution temperature (LCST) ranging from about 100° F. to about 300° F.; and
      a curing agent;
   introducing the treatment fluid into the subterranean formation; and
   allowing the treatment fluid to cure to consolidate particles in the subterranean formation, wherein the treatment fluid, after curing via the curing agent at a temperature above 100° F., has a compressive strength greater than 1,000 lbf/in$^2$ and up to 2,850 lbf/in$^2$ and a retained permeability of over 75%.

12. The method of claim 11, wherein the treatment fluid has the viscosity less than about 5 cP for up to twenty-four hours at ambient temperature.

13. The method of claim 11, wherein a temperature of the subterranean formation is at least the LCST of the surfactant.

14. The method of claim 11, wherein the resin system has a resin viscosity less than about 50 cP.

15. The method of claim 11, wherein preparing the treatment fluid comprises mixing the resin system, the surfactant, and the curing agent in an aqueous solvent.

16. The method of claim 15, wherein the aqueous solvent comprises fresh water.

17. The method of claim 15, wherein the aqueous solvent comprises up to 5% KCl.

18. The method of claim 1, wherein the particles in the subterranean formation comprise sand in the subterranean formation, proppant pumped into one or more fractures of the subterranean formation, or both.

19. The method of claim 1, wherein the viscosity of the treatment fluid stays below 5 cP for up to two hours at an additional temperature up to about 140° F.

20. The method of claim 11, wherein the viscosity of the treatment fluid is less than 5 cP for at least 24 hours at ambient temperature.

* * * * *